United States Patent [19]

Mundt et al.

[11] Patent Number: 4,463,865

[45] Date of Patent: Aug. 7, 1984

[54] KNIFE BLADE APPARATUS FOR SEVERING RUPTURE DISKS

[75] Inventors: Arnold L. Mundt; Gioan Nguyen, both of Tulsa, Okla.

[73] Assignee: BS&B Safety Systems, Inc., Tulsa, Okla.

[21] Appl. No.: 535,152

[22] Filed: Sep. 23, 1983

[51] Int. Cl.³ .............................................. F16K 17/40
[52] U.S. Cl. ................................. 220/89 A; 137/68 R; 285/91
[58] Field of Search ............................ 220/89 A, 298; 137/68 R, 315; 285/91, 404

[56] References Cited

U.S. PATENT DOCUMENTS

| | | | |
|---|---|---|---|
| 1,947,743 | 2/1934 | Schoeneck | 285/91 |
| 3,531,011 | 9/1970 | Wolfe | 220/298 |
| 3,872,874 | 3/1975 | Nedelec et al. | 220/89 A X |
| 3,934,602 | 1/1976 | Muddiman et al. | 220/89 A X |
| 4,342,988 | 8/1982 | Thompson et al. | 220/89 A X |
| 4,363,418 | 12/1982 | Matz | 220/89 A |
| 4,394,926 | 7/1983 | Ou et al. | 137/68 R X |

Primary Examiner—Allan N. Shoap
Attorney, Agent, or Firm—C. Clark Dougherty, Jr.

[57] ABSTRACT

An improved knife blade apparatus adapted to be installed in a rupture disk assembly whereby upon failure of the rupture disk in the assembly, the disk is severed by the knife blade apparatus. The apparatus includes an annular support member adapted to be installed in the assembly adjacent the rupture disk having an annular groove and at least two longitudinal grooves intersecting the annular groove disposed interiorly therein. Knife blade means are disposed interiorly of the support member including exterior portions which extend into the grooves in the support member. The exterior portions of the knife blade means are moved by way of the longitudinal grooves in the support member into the annular groove thereof and then within the annular groove to positions away from the longitudinal grooves to thereby removably attach the knife blade means to the support member. Removable retaining means are attached to the support member for retaining the exterior portions of the knife blade means in the annular groove of the support member.

15 Claims, 9 Drawing Figures

KNIFE BLADE APPARATUS FOR SEVERING RUPTURE DISKS

BACKGROUND OF THE INVENTION

1. Field of the Invention

The present invention relates to improved knife blade apparatus for severing rupture disks, and more particularly, but not by way of limitation, to an improved knife blade apparatus adapted to be installed in a rupture disk assembly.

2. Description of the Prior Art

Rupture disk assemblies which include knife blades for severing the rupture disks upon the failure thereof have been developed and used heretofore. For example, U.S. Pat. No. 3,294,277 issued to Wood on Dec. 27, 1966, discloses a reverse buckling rupture disk assembly including knife blade apparatus for severing the rupture disk. In operation of the assembly, when the reverse buckling rupture disk fails as a result of fluid pressure exerted thereon, it reverses itself, impales on the knife blades and is severed whereby full opening of the rupture disk without fragmentation is achieved.

In most of the prior rupture disk assemblies which include knife blades, the knife blades are comprised of four sharpened blade legs of equal length having the interior ends thereof connected together and having the exterior ends rigidly welded or bolted to the interior of an annular support member. This type of knife blade apparatus is expensive to manufacture and where the blades are welded directly to the support member, the heat of welding causes stresses to be set up in the blades which often result in cracks or fractures therein when the blades are subjected to the impact loads associated with the failure of rupture disks. In addition, after one or more rupture disks have been severed by the knife blades, the blades become dull and either require the entire knife blade apparatus to be replaced or a time consuming unbolting and bolting operation to be performed. Another problem associated with knife blades which are welded or bolted to a support member arises in applications where the fluids relieved through the rupture disk assembly are cold, cool upon expansion or are hot. Upon contacting the knife blades which are rigidly attached within the support member, such fluids cause rapid contraction or expansion of the blades which in turn brings about the breaking or cracking thereof. That is, when the rupture disk in such an assembly ruptures and is severed by the knife blades, cold or hot fluid flowing through and being relieved by the rupture disk assembly quickly cools or heats the knife blades causing the knife blades to rapidly contract or expand. This in turn often causes the knife blades to crack either in one or more of the blade legs or in one or more of the welds at the points of attachment of the blade legs to the support member.

The knife blade apparatus disclosed in U.S. Pat. No. 4,363,418 issued to Matz on Dec. 14, 1982, includes a groove and annular snap ring arrangement whereby the knife blades are removably attached to an annular support member and are free to expand or contract therein. While this apparatus overcomes the problems mentioned above associated with apparatus where the knife blades are rigidly welded or bolted into the support member, the knife blades of the Matz apparatus can inadvertently be installed upside down in the apparatus, and because of the use of a snap ring, the apparatus is relatively expensive to manufacture.

By the present invention an improved knife blade apparatus adapted to be installed in a rupture disk assembly is provided whereby the knife blades of the apparatus are removable, they cannot be installed upside down, the apparatus is relatively inexpensive to manufacture and the knife blades are free to expand or contract while attached to the support member.

SUMMARY OF THE INVENTION

An improved knife blade apparatus is provided adapted to be installed in a rupture disk assembly whereby upon failure of the rupture disk in the assembly, the disk is severed by the knife blade apparatus. An annular support member is provided adapted to be installed in the rupture disk assembly which includes an annular groove and at least two spaced-apart longitudinal grooves intersecting the annular groove disposed interiorly therein. A knife blade assembly is disposed within the support member having exterior portions which extend into the grooves in the support member. The exterior portions of the knife blade assembly are moved by way of the longitudinal grooves in the support member into the annular groove thereof and then within the annular groove to positions away from the longitudinal grooves to thereby removably attach the knife blade assembly to the support member. A removable retaining means is attached to the support member for retaining the exterior portions of the knife blade assembly in the annular groove.

It is, therefore, a general object of the present invention to provide an improved knife blade apparatus for severing rupture disks.

A further object of the present invention is the provision of an improved knife blade apparatus adapted to be installed in a rupture disk assembly whereby problems associated with the cracking of the knife blade apparatus due to rapid increases or decreases in the temperature of the apparatus are eliminated.

Yet a further object of the present invention is the provision of an improved knife blade apparatus adapted to be installed in a rupture disk assembly which is relatively inexpensive to manufacture and wherein the knife blade means are removably held within an annular support member but cannot be installed upside down therein.

Still a further object of the present invention is the provision of improved knife blade apparatus wherein knife blade means are held within the interior of an annular support member in a manner whereby the knife blade means are free to expand or contract.

Another object of the present invention is the provision of improved knife blade apparatus wherein the removal and replacement of the blades in the apparatus can be accomplished quickly and easily without returning the apparatus to the factory.

Other and further objects, features and advantages of the present invention will be readily apparent to those skilled in the art upon a reading of the brief description of preferred embodiments which follows when taken in conjunction with the accompanying drawings.

DESCRIPTION OF PREFERRED EMBODIMENTS

Figure 1:
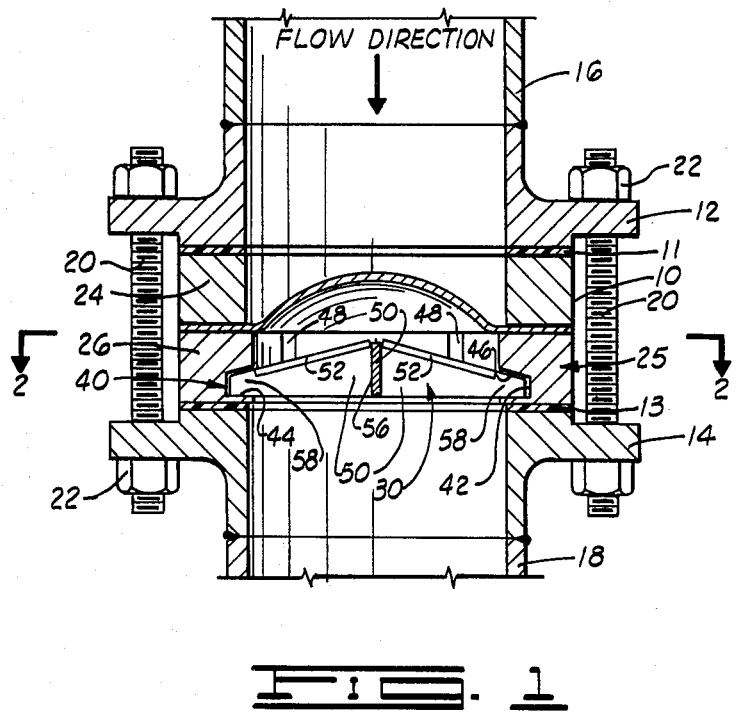
FIG. 1 is a side cross-sectional view of a rupture disk assembly including the improved knife blade apparatus of the present invention clamped between a pair of companion flanges.
Figure 2:
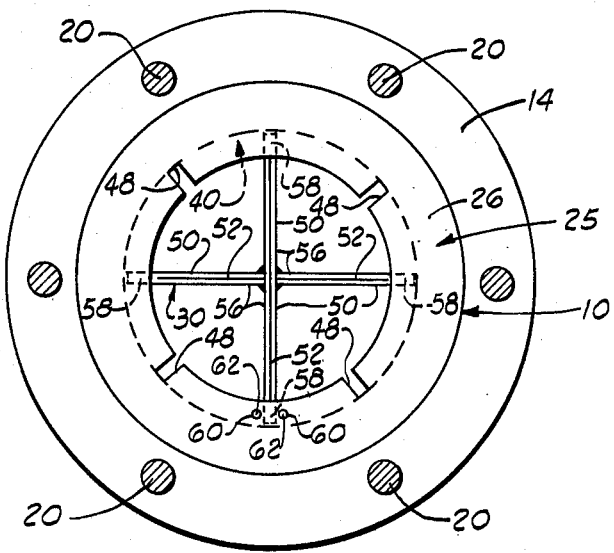
FIG. 2 is a cross-sectional view of the assembly of FIG. 1 taken along line 2—2 of FIG. 1.

Referring now to the drawings and particularly to FIGS. 1 and 2, a reverse buckling rupture disk assembly including the improved knife blade apparatus of the present invention is illustrated and generally designated by the numeral 10. The assembly 10 is shown clamped between a pair of companion inlet and outlet flanges 12 and 14, respectively, which are in turn attached to inlet and outlet conduits 16 and 18, respectively. The inlet conduit 16 is connected to a vessel or system containing fluid under pressure whereby such pressure is communicated to the rupture disk assembly 10. When the pressure exerted on the rupture disk assembly 10 exceeds the predetermined design rupture pressure thereof, the rupture disk assembly opens whereby fluid pressure is relieved through the assembly and led to the atmosphere or other location by the conduit 18.

The rupture disk assembly 10 and conventional gaskets 11 and 13 are clamped between the flanges 12 and 14 by a plurality of studs 20 and nuts 22 positioned in openings around the peripheries of the flanges. The assembly 10 is comprised of an annular inlet support member 24, the knife blade apparatus of the present invention 25 which includes an annular outlet support member 26, and a reverse buckling rupture disk 28 positioned therebetween. The knife blade apparatus 25 includes a knife blade assembly 30 positioned within the interior of the annular support member 26 whereby upon failure of the rupture disk 28, i.e., the reversal thereof due to excess fluid pressure being exerted thereon, the rupture disk 28 contacts the knife blade assembly 30 and is severed thereby allowing fluids under pressure to be relieved through the assembly 10. The rupture disk assembly 10 can take various other forms, e.g., the rupture disk 28 can be other than a reverse buckling disk, it can include more than one part, more than one rupture disk can be included, etc.

The annular support member 26 of the knife blade apparatus 25 includes an annular groove 40 positioned interiorly thereof. As best shown in FIG. 1, the annular groove 40 is asymmetric in cross-sectional shape, i.e., the longitudinal wall 42 of the annular groove 40 is connected to side walls 44 and 46 thereof which are not parallel. That is, the side wall 44 is parallel to the sides of the annular support member 26 but the side wall 46 is oblique thereto, preferably sloping from the longitudinal wall 42 to the interior of the support member 26 away from the side 44. As shown in FIG. 2, the support member 26 includes four longitudinal grooves 48 disposed in the interior thereof which intersect the annular groove 40 and which are equally spaced around the interior of the member 26.

The knife blade assembly 30 is comprised of four sharpened blade legs 50 having the sharpened portions 52 thereof facing the rupture disk 28. The interior ends 56 of the blade legs 50 are connected together, such as by welding, and the exterior ends 58 of the blade legs 50 extend into and are supported by the annular groove 40 of the annular support member 25. The lengths of the blade legs 50 are such that the knife blade assembly 30 fits loosely within the annular groove 40 whereby it is free to expand and contract therein. The exterior ends 58 of the blade legs 50 each are of sizes and shapes such that they fit into and can be moved within the longitudinal grooves 48 as well as the annular groove 40 of the support member 25. In addition, the ends 58 of the blade legs 50 are of shapes corresponding with the asymmetric cross-sectional shape of the annular groove 40 whereby the ends 58 will not fit within the groove 40 if the assembly 30 is upside down with respect to the support member 26.

The support member 26 also includes a pair of longitudinal apertures 60 which intersect the annular groove 40. The exterior end 58 of one of the blade legs 50 is positioned between the apertures 60 and removable pins 62 are disposed in the apertures 60.

Figure 3:
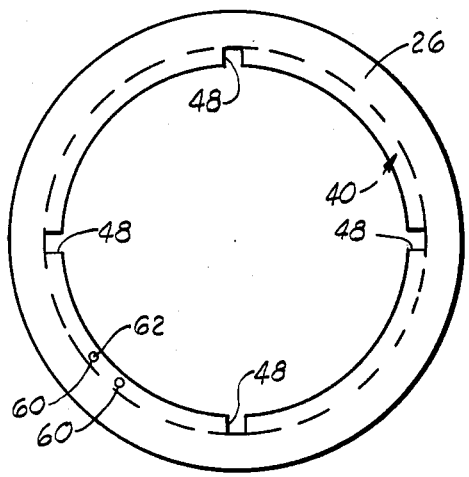
FIG. 3 is a top view of the annular support member of FIGS. 1 and 2.

Referring now to FIGS. 3-6, the annular support member 26 of the apparatus 10 is illustrated and the installation of the knife blade assembly 30 therein is sequentially shown. That is, as shown in FIG. 3, prior to the installation of the knife blade assembly 30 in the annular support member 26, one of the removable pins 62 is installed in one of the apertures 60 of the support member 26.

Figure 4:
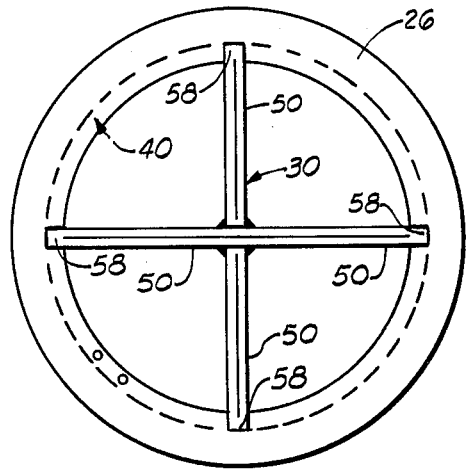
FIG. 4 is a view similar to FIG. 3 but showing the knife blade means of FIGS. 1 and 2 positioned within the longitudinal grooves of the annular support member.

As shown in FIG. 4, the knife blade assembly 30 is next positioned within the interior of the support member 26 with the exterior portions of the assembly, i.e., the exterior ends 58 of the blade legs 50, extending into within the annular groove 40. This is accomplished by fitting the exterior ends 58 of the blade legs 50 into the longitudinal grooves 48 in the support member and then moving the ends therewithin into the annular groove 40.

Figure 5:
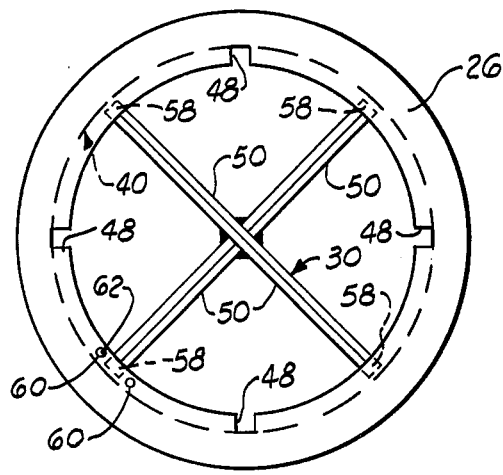
FIG. 5 is a view similar to FIGS. 3 and 4 with the knife blade means rotated 45° in the annular groove of the support member.

As illustrated in FIG. 5, the knife blade assembly 30 is next rotated clockwise with the ends 58 of the blade legs 50 thereof within the annular groove 40 to a position whereby the ends 58 are positioned away from the longitudinal grooves 48 and whereby one of the ends 58 is located between the apertures 60 and adjacent the pin 62 previously installed in one of the apertures.

Figure 6:
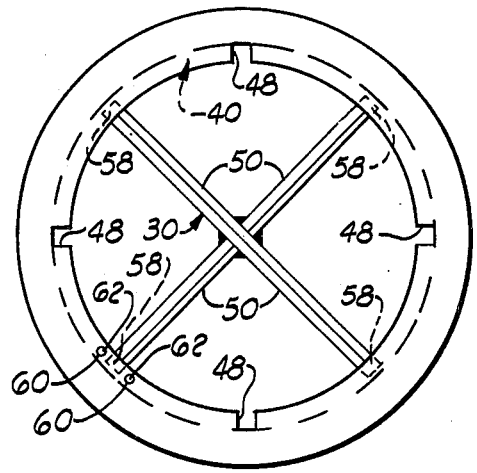
FIG. 6 is a view similar to FIGS. 3-5 illustrating the apparatus after the second retaining pin has been installed in the annular support member.
Figure 7:
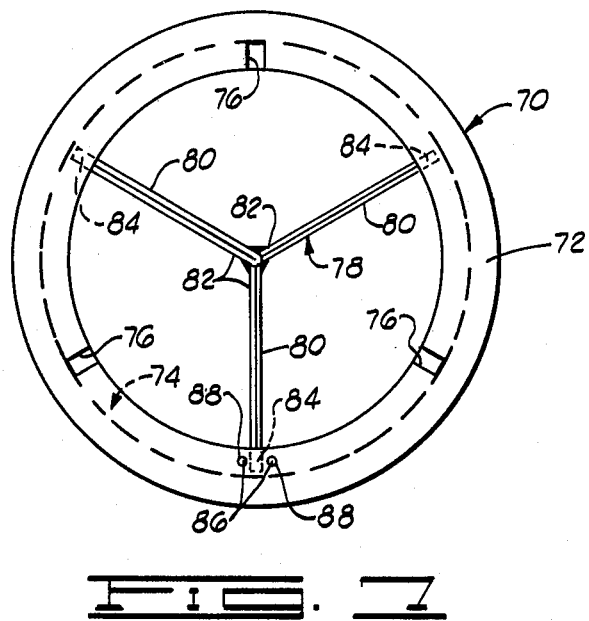
FIG. 7 is a top view of an alternate embodiment of the present invention having a three-bladed knife blade means installed therein.

Finally, as shown in FIG. 6, another removable pin 62 is placed in the other aperture 60 whereby the knife blade assembly 30 is retained attached to the support member 26. The knife blade assembly 30 is thus removably attached to the support member 26 in a manner whereby the assembly 30 is free to expand or contract therein, cannot be installed upside down and can be easily removed therefrom.

As will be understood, to remove the knife blade assembly 30 from the annular suport member 26, the various steps described above relating to installing the blade assembly are carried out in reverse order.

Referring now to FIGS. 7-10, some of the alternate forms of the knife blade apparatus of the present invention which can be utilized are illustrated. More specifically, the apparatus 70 illustrated in FIG. 7 includes an annular support member 72 having an annular groove 74 formed interiorly therein and three equally spaced lateral grooves 76 formed therein which intersect the annular groove 74. A knife blade member 78 is removably attached to the annular support member 72. That is, the knife blade member 78 is comprised of three blade legs 80 which have the interior ends 82 thereof connected together and the exterior ends 84 thereof extending into and retained by the annular groove 74 in the support member 72. The knife blade member 78 is moved into the annular groove 74 and removed therefrom in the same manner as described above for the apparatus 10, and the ends 84 of the blade legs 80 are retained in positions away from the longitudinal grooves 76 by a pair of removable pins 86 disposed in apertures 88 on opposite sides of one of the blade leg ends 84.

Figure 8:
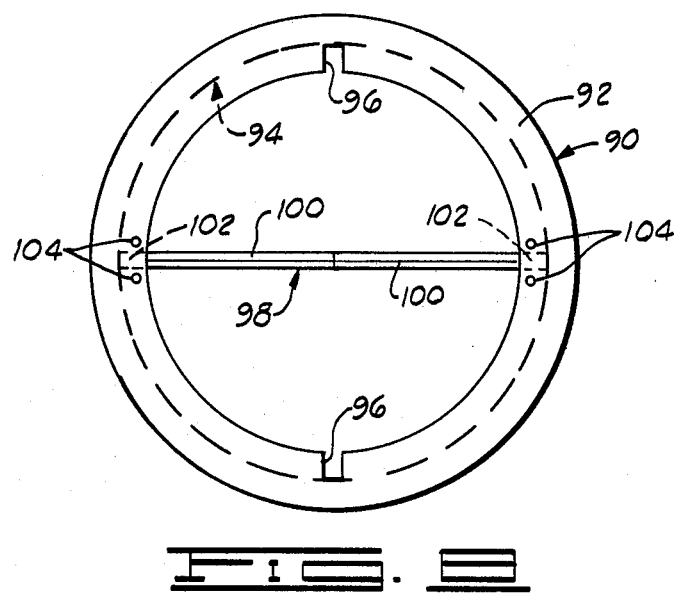
FIG. 8 is a top view of another embodiment of the present invention having a two-bladed knife blade means installed therein.

Referring now to FIG. 8 another form of the apparatus of the present invention generally designated by the numeral 90 is illustrated. The apparatus 90 includes an annular support member 92 having an annular groove 94 disposed interiorly therein and having opposite longitudinal grooves 96 which intersect the annular groove 94 formed therein. A knife blade member 98 comprised of two sharpened blade legs 100 connected together at the interior ends is removably attached to the annular support member 92. That is, the exterior ends 102 of the blade legs 100 extend into the annular groove 94 and are maintained therein by oppositely positioned pairs of removable pins 104. The knife blade member 98 is installed in and removed from the annular support member 92 in the same manner as described above for the apparatus 10.

Figure 9:
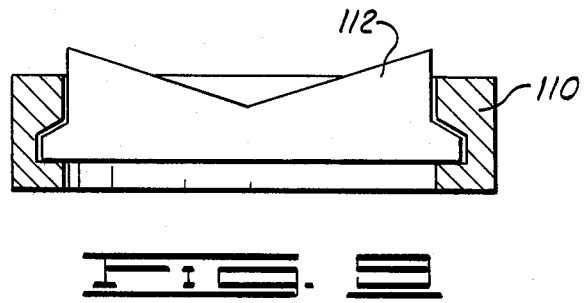
FIG. 9 is a side cross-sectional view of the apparatus of the present invention including an alternate form of knife blade means.

In FIG. 9, an annular support member 110 is illustrated having a knife blade member 112 of different design removably retained therein.

As mentioned above, in whatever form the knife blades take, they include exterior portions which extend into and loosely fit within an annular groove in the interior of an annular support member. The annular support member includes a number of longitudinal grooves intersecting with the annular groove equal to the number of exterior portions of the knife blade member whereby the knife blade member can be installed and removed by rotating it into and out of the annular groove by way of the longitudinal grooves. The asymmetric shape of the annular groove and the exterior portion of the knife blade member prevent the knife blade member from being installed in the support member upside down, and because the knife blade member can expand or contract within the groove, failures caused by expansion and contraction are eliminated. The number of retaining pins used to removably retain the knife blade member attached to the annular support member can vary widely and more or less than those used in the various embodiments described herein can be utilized.

Thus, the present invention is well adapted to carry out the objects and attain the ends and advantages mentioned as well as those inherent therein. While numerous changes in the construction and arrangement of parts can be made by those skilled in the art, such changes are encompassed within the spirit of this invention as defined by the appended claims.

What is claimed is:

1. An improved knife blade apparatus adapted to be installed in a rupture disk assembly whereby upon failure of the rupture disk in the assembly, the disk is severed by the knife blade apparatus comprising:

an annular support member adapted to be installed in said rupture disk assembly, said support member including an annular groove and at least two spaced-apart longitudinal grooves intersecting said annular groove disposed interiorly therein;

knife blade means disposed interiorly of said support member, said knife blade means including exterior portions which extend into said grooves in said support member whereby said exterior portion can be moved by way of said longitudinal grooves into said annular groove and then within said annular groove to positions away from said longitudinal grooves to thereby removably attach said knife blade means to said support member; and removable retaining means attached to said support member for retaining said exterior portions of said knife blade means in said positions in said annular groove away from said longitudinal grooves.

2. The apparatus of claim 1 wherein said knife blade means include two sharpened blade legs the exterior ends of which extend into said grooves in said support member.

3. The apparatus of claim 1 wherein said knife blade means include at least three sharpened blade legs the interior ends of which are connected together and the exterior ends of which are spaced apart and extend into said grooves in said support member.

4. The apparatus of claim 3 wherein said knife blade means include four sharpened blade legs.

5. The apparatus of claim 1 wherein said removable retaining means are comprised of:

at least one longitudinal aperture disposed in said support member which intersects said annular groove therein; and at least one retaining pin removably disposed in said aperture whereby an exterior portion of said knife blade means extending into said annular groove is retained therein by said pin.

6. The apparatus of claim 5 wherein a pair of adjacent apertures are disposed in said support member and retaining pins are removably disposed in said apertures with an exterior portion of said knife blade means positioned therebetween.

7. An improved knife blade apparatus adapted to be installed in a rupture disk assembly whereby upon failure of the rupture disk in the assembly, the disk is severed by said knife blade apparatus comprising:

an annular support member adapted to be installed in said assembly with one side thereof facing said rupture disk, said support member including an annular groove disposed interiorly therein lying in a plane parallel to the side thereof facing said rupture disk with at least two longitudinal grooves intersecting said annular groove also disposed in the interior of said support member and at least one pair of adjacent longitudinal apertures disposed in said support member which intersect said annular groove therein;

knife blade means adapted to be positioned interiorly of said support member including at least two sharpened blade legs having the interior ends thereof connected together and having the exterior ends thereof adapted to extend into said grooves in said support member whereby the exterior ends of said blade legs can be moved by way of said longitudinal grooves into said annular groove and then within said annular groove to positions away from said longitudinal grooves to thereby removably attach said knife blade means to said support member; and a pair of retaining pins removably disposed in said longitudinal apertures with the exterior end of one of said blade legs positioned therebetween.

8. The apparatus of claim 7 wherein said knife blade means includes three sharpened blade legs and said support member includes three corresponding longitudinal grooves therein.

9. The apparatus of claim 7 wherein said knife blade means includes four sharpened blade legs and said support member includes four corresponding longitudinal grooves therein.

10. A rupture disk assembly comprising:
a rupture disk having an annular exterior flange portion;
an inlet annular support member having a seating surface for sealingly engaging one side of the annular flange portion of said rupture disk;
a knife blade apparatus having an annular seating surface for sealingly engaging the other side of the annular flange portion of said rupture disk, said knife blade apparatus comprising:
an outlet annular support member having an annular seating surface for sealingly engaging said rupture disk, said support member including an annular groove disposed interiorly therein with at least two longitudinal grooves intersecting said annular groove also disposed in the interior of said support member and at least one pair of adjacent longitudinal apertures disposed in said support member which intersect said annular groove therein;

knife blade means positioned interiorly of said support member including at least two sharpened blade legs having the interior ends thereof connected together with the sharpened portions thereof facing said rupture disk and having the exterior ends thereof adapted to extend into said longitudinal and annular grooves in said support member whereby the exterior ends of said blade legs can be moved by way of said longitudinal grooves into said annular groove and then within said annular groove to positions away from said longitudinal groove to thereby removably attach said knife blade means to said support member; and a pair of retaining pins removably disposed in said pair of longitudinal apertures with the exterior end of one of said blade legs positioned therebetween to thereby retain the exterior ends of said knife blade means at positions in said annular groove away from said longitudinal grooves.

11. The apparatus of claim 10 wherein said knife blade means includes three sharpened blade legs and said support member includes three corresponding longitudinal grooves therein.

12. The apparatus of claim 10 wherein said knife blade means includes four sharpened blade legs and said support member includes four corresponding longitudinal grooves therein.

13. The apparatus of claim 10 wherein said rupture disk is a reverse buckling rupture disk.

14. The apparatus of claim 10 wherein said inlet and outlet support members are adapted for being sealingly clamped between a pair of complementary flanges.

15. The apparatus of claim 10 wherein said annular groove in said support member is of an asymmetric shape in cross section and the exterior ends of the blade legs of said knife blade means are of the same asymmetric shape as said annular groove whereby said knife blade means cannot be installed upside-down in said knife blade apparatus.

* * * * *